(12) United States Patent
Takatsu et al.

(10) Patent No.: US 9,917,620 B2
(45) Date of Patent: Mar. 13, 2018

(54) POWER-SUPPLYING DEVICE FOR VEHICLE

(71) Applicant: IHI Corporation, Tokyo (JP)

(72) Inventors: Yuji Takatsu, Tokyo (JP); Motonao Niizuma, Tokyo (JP); Akio Ueda, Tokyo (JP); Kei Akune, Tokyo (JP); Tooru Hayashi, Tokyo (JP)

(73) Assignee: IHI Corporation, Tokyo (JP)

( * ) Notice: Subject to any disclaimer, the term of this patent is extended or adjusted under 35 U.S.C. 154(b) by 384 days.

(21) Appl. No.: 14/659,765

(22) Filed: Mar. 17, 2015

(65) Prior Publication Data
US 2015/0195012 A1   Jul. 9, 2015

Related U.S. Application Data

(63) Continuation of application No. PCT/JP2013/076241, filed on Sep. 27, 2013.

(30) Foreign Application Priority Data

Sep. 27, 2012  (JP) ................................ 2012-214319

(51) Int. Cl.
*H01F 27/42* (2006.01)
*H04B 5/00* (2006.01)
(Continued)

(52) U.S. Cl.
CPC .......... *H04B 5/0037* (2013.01); *B60L 11/182* (2013.01); *B60L 11/1824* (2013.01); *B60L 11/1829* (2013.01); *H02J 5/005* (2013.01); *H02J 7/025* (2013.01); *H02J 50/10* (2016.02);
*H02J 50/90* (2016.02); *Y02T 10/7005* (2013.01); *Y02T 10/7072* (2013.01); *Y02T 90/12* (2013.01);
(Continued)

(58) Field of Classification Search
None
See application file for complete search history.

(56) References Cited

U.S. PATENT DOCUMENTS 5,703,461 A    12/1997  Minoshima et al.
8,035,255 B2   10/2011  Kurs et al.
(Continued)

FOREIGN PATENT DOCUMENTS

CN   102257698 A   11/2011
CN   102648560 A   8/2012
(Continued)

OTHER PUBLICATIONS

International Search Report, PCT/JP2013/076241, dated Oct. 29, 2013, 2 pgs.

*Primary Examiner* — Lincoln Donovan
*Assistant Examiner* — Khareem E Almo
(74) *Attorney, Agent, or Firm* — Volpe and Koenig, P.C.

(57) ABSTRACT

A vehicle power-supplying device includes: a power-supplying primary coil provided in a parking space where a vehicle is parked, and configured to supply electric power wirelessly to a power-supplying secondary coil provided in the vehicle and configured to wirelessly receive the electric power from the power-supplying primary coil; and a vehicle stopping member configured to stop the vehicle at a desired position of the parking space at which wireless power supply efficiency from the power-supplying primary coil to the power-supplying secondary coil is high.

9 Claims, 6 Drawing Sheets

(51) Int. Cl.
*B60L 11/18* (2006.01)
*H02J 5/00* (2016.01)
*H02J 7/02* (2016.01)
*H02J 50/10* (2016.01)
*H02J 50/90* (2016.01)

(52) U.S. Cl.
CPC ............ *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 8,106,539 B2 | 1/2012 | Schatz et al. | |
| 2010/0117596 A1* | 5/2010 | Cook | B60L 11/182 320/108 |
| 2010/0264747 A1* | 10/2010 | Hall | B60L 11/182 307/104 |
| 2011/0114401 A1 | 5/2011 | Kanno | |
| 2011/0140658 A1* | 6/2011 | Outwater | B60L 11/1824 320/109 |
| 2011/0181240 A1 | 7/2011 | Baarman et al. | |
| 2011/0187317 A1 | 8/2011 | Mitake et al. | |
| 2011/0220446 A1 | 9/2011 | Hubner | |
| 2012/0112531 A1* | 5/2012 | Kesler | B60L 11/182 307/9.1 |
| 2013/0030615 A1* | 1/2013 | Ichikawa | B60L 11/182 701/22 |
| 2013/0181667 A1* | 7/2013 | Takeshita | B60L 11/182 320/108 |
| 2013/0193749 A1* | 8/2013 | Nakamura | B60L 3/00 307/9.1 |
| 2014/0055089 A1* | 2/2014 | Ichikawa | H01F 38/14 320/108 |
| 2014/0070764 A1* | 3/2014 | Keeling | H02J 50/50 320/108 |
| 2014/0111002 A1* | 4/2014 | Horiuchi | H01F 38/14 307/9.1 |
| 2014/0111021 A1* | 4/2014 | Nakamura | B60M 7/003 307/104 |
| 2014/0183970 A1* | 7/2014 | Kurihara | H02J 50/60 307/104 |
| 2014/0217966 A1* | 8/2014 | Schneider | B60L 11/1829 320/108 |
| 2014/0257614 A1* | 9/2014 | Niizuma | B60L 11/182 701/22 |
| 2015/0061583 A1* | 3/2015 | Nakamura | H01F 27/36 320/108 |
| 2015/0069964 A1* | 3/2015 | Kamikihara | B60L 11/182 320/108 |
| 2015/0069967 A1 | 3/2015 | Baarman et al. | |
| 2015/0077046 A1* | 3/2015 | Huang | H02J 50/05 320/108 |
| 2015/0091510 A1* | 4/2015 | Iwawaki | H02J 7/025 320/108 |
| 2015/0091511 A1* | 4/2015 | Ichikawa | H02J 5/005 320/108 |
| 2015/0102684 A1* | 4/2015 | Tanaka | B60L 11/1833 307/104 |
| 2015/0123465 A1* | 5/2015 | Ichikawa | B60L 11/14 307/9.1 |
| 2015/0136499 A1* | 5/2015 | Ichikawa | B60L 11/182 180/54.1 |
| 2015/0137590 A1* | 5/2015 | Ichikawa | H01F 38/14 307/9.1 |
| 2015/0195012 A1* | 7/2015 | Takatsu | B60L 11/182 307/104 |
| 2015/0224882 A1* | 8/2015 | Brill | B60L 11/182 320/108 |
| 2015/0255994 A1* | 9/2015 | Kesler | H02J 5/005 307/10.1 |
| 2015/0263536 A1* | 9/2015 | Niizuma | B60L 11/1829 307/104 |
| 2015/0357828 A1* | 12/2015 | Ichikawa | H01F 38/14 307/104 |
| 2016/0016478 A1* | 1/2016 | Saito | B60L 11/182 307/104 |
| 2016/0049798 A1* | 2/2016 | Maikawa | B60L 11/182 307/104 |
| 2016/0052405 A1* | 2/2016 | Koizumi | H02J 5/005 320/108 |
| 2016/0052408 A1* | 2/2016 | Asai | B60L 11/182 180/65.1 |
| 2016/0082847 A1* | 3/2016 | Asai | B60L 11/182 307/10.1 |
| 2016/0082848 A1* | 3/2016 | Ichikawa | B60L 11/123 701/22 |
| 2016/0087687 A1* | 3/2016 | Kesler | H04B 5/0037 307/104 |
| 2016/0089987 A1* | 3/2016 | Ichikawa | B60L 11/182 701/22 |
| 2016/0089988 A1* | 3/2016 | Bartz | B60L 11/182 320/108 |
| 2016/0114686 A1* | 4/2016 | Beattie, Jr. | B60L 11/182 320/108 |
| 2016/0159234 A1* | 6/2016 | Lewis | B60R 1/00 701/22 |
| 2016/0193930 A1* | 7/2016 | Fujita | H02J 5/005 307/104 |
| 2016/0197487 A1* | 7/2016 | Koizumi | H01F 38/14 307/104 |
| 2016/0197492 A1* | 7/2016 | Fujita | H01F 38/14 307/104 |
| 2016/0332575 A1* | 11/2016 | Fukushima | B60L 11/1803 |
| 2016/0375784 A1* | 12/2016 | Takatsu | B60L 11/1846 320/108 |
| 2017/0012459 A1* | 1/2017 | Takatsu | B60L 11/1818 |
| 2017/0018963 A1* | 1/2017 | Takatsu | H02J 7/025 |
| 2017/0033606 A1* | 2/2017 | Maikawa | H02J 50/70 |
| 2017/0043672 A1* | 2/2017 | Araki | H02J 7/00 |
| 2017/0063160 A1* | 3/2017 | Sato | B60L 11/182 |
| 2017/0136631 A1* | 5/2017 | Li | B25J 19/005 |

FOREIGN PATENT DOCUMENTS

| | | |
|---|---|---|
| CN | 102695629 A | 9/2012 |
| JP | 4-114949 U | 10/1992 |
| JP | 09-172743 A | 6/1997 |
| JP | 2008-120357 A | 5/2008 |
| JP | 2011-060260 A | 3/2011 |
| JP | 2011-097814 A | 5/2011 |
| JP | 2011-182608 A | 9/2011 |
| WO | 2011/151696 A2 | 12/2011 |

* cited by examiner

POWER-SUPPLYING DEVICE FOR VEHICLE

This application is a Continuation of International Application No. PCT/JP2013/076241, filed on Sep. 27, 2013, claiming priority based on Japanese Patent Application No. 2012-214319, filed Sep. 27, 2012, the content of which is incorporated herein by reference in their entirety.

TECHNICAL FIELD

The present invention relates to a power-supplying device for a vehicle that supplies electric power to a vehicle which can receive electric power.

BACKGROUND ART

In recent years, vehicles which are driven by electricity have been used. It is necessary to supply electric power to the vehicles. A power-supplying apparatus supplies electric power to a parked vehicle, for example. The power-supplying apparatus may wirelessly supply electric power to the vehicle.

For example, a technique has been proposed in which a wireless power-supplying secondary coil is provided in the bottom of a vehicle and electric power is supplied from a power-supplying primary coil below the vehicle to the vehicle. It is preferable to wirelessly supply electric power from the power-supplying primary coil to the power-supplying secondary coil with low energy loss. FIG. 6 illustrates a concept of a wireless power-supplying system. FIG. 6 is a diagram disclosed in U.S. Pat. No. 8,035,255. In addition, when electric power is wirelessly supplied from the power-supplying primary coil to the power-supplying secondary coil, it is preferable that the wireless power-supplying system be easy to use.

PRIOR ART DOCUMENTS

Patent Documents

[Patent Document 1] Japanese Unexamined Patent Application, First Publication No. 2011-60260
[Patent Document 2] Japanese Unexamined Patent Application, First Publication No. 2011-97814
[Patent Document 3] U.S. Pat. No. 8,035,255
[Patent Document 4] U.S. Pat. No. 8,106,539

DISCLOSURE OF THE INVENTION

Problems to be Solved by the Invention

The invention is made in view of the above-mentioned circumstances and an object of the invention is to provide a power-supplying device for a vehicle that has a simple structure and low energy loss and can supply electric power with ease of use.

Means for Solving the Problems

According to a first aspect of the invention, there is provided a power-supplying device for a vehicle, the power-supplying device for supplying electric power to the vehicle provided with a power-supplying secondary coil configured to wirelessly receive the electric power from a power-supplying primary coil. The power-supplying device includes: the power-supplying primary coil provided in a parking space in which the vehicle is parked, the power-supplying primary coil configured to wirelessly supply the electric power to the power-supplying secondary coil; and a vehicle stopping member configured to stop the vehicle at a desired position of the parking space at which wireless power supply efficiency from the power-supplying primary coil to the power-supplying secondary coil is high.

According to the first aspect of the invention, it is possible to wirelessly supply electric power to the vehicle which is parked in the parking space with high efficiency.

According to a power-supplying device in a second aspect of the invention, in the first aspect, the vehicle stopping member may include: a wheel stopper provided in the parking space and configured to stop movement of the vehicle by coming into contact with an outer circumference of a wheel of the vehicle; and a wheel stopper moving mechanism configured to move a position of the wheel stopper in a front-and-back direction.

According to the second aspect of the invention, it is possible to wirelessly supply electric power to the vehicle which is parked in the parking space with high efficiency.

According to a power-supplying device in a third aspect of the invention, in the first aspect, the vehicle stopping member may include: a wheel stopper provided in the parking space and configured to stop movement of the vehicle by coming into contact with an outer circumference of a wheel of the vehicle; a wheel stopper moving mechanism configured to move a position of the wheel stopper in a front-and-back direction; and an acquisition, member configured to acquire positional information corresponding to a position of the power-supplying secondary coil provided in the vehicle. The wheel stopper moving mechanism may move the position of the wheel stopper in the front-and-back direction on the basis of the positional information acquired by the acquisition member.

According to the third aspect of the invention, it is possible to wirelessly supply electric power to the vehicle which is parked in the parking space with high efficiency.

According to a power-supplying device in a fourth aspect of the invention, in the first aspect, the vehicle stopping member may include: a wheel stopper provided in the parking space and configured to stop movement of the vehicle by coming into contact with an outer circumference of a wheel of the vehicle; a wheel stopper moving mechanism configured to move a position of the wheel, stopper in a front-and-back direction; a storage member configured to store vehicle type information of the vehicle and positional information corresponding to a position of the power-supplying-secondary coil provided in the vehicle so as to be associated with each other; and an information acquisition member configured to receive the vehicle type information of the vehicle and acquire the positional information associated with the vehicle type information from the storage member. The wheel stopper moving mechanism may move the position of the wheel stopper in the front-and-back direction on the basis of the positional information acquired by the information acquisition member.

According to the fourth aspect of the invention, it is possible to wirelessly supply electric power to the vehicle which is parked in the parking space with high efficiency.

According to a power-supplying device in a fifth aspect of the invention in the first aspect, the vehicle stopping member may include: an acquisition member configured to acquire a position of the power-supplying secondary coil provided in the vehicle; and an instruction member configured to instruct a driver of the vehicle entering the parking space on stop timing on the basis of the position of the power-supplying secondary coil acquired by the acquisition member.

According to the fifth aspect of the invention, it is possible to wirelessly supply electric power to the vehicle which is parked in the parking space with high efficiency.

According to a power-supplying device in a sixth aspect of the invention, in the first aspect, the vehicle stopping member may include: a storage member configured to store vehicle type information of the vehicle and positional information corresponding to a position of the power-supplying secondary coil provided in the vehicle so as to be associated with each other; an information acquisition member configured to receive the vehicle type information of the vehicle and acquire the positional information associated with the vehicle type information from the storage member; and an instruction member configured to instruct a driver of the vehicle entering the parking space on stop timing on the basis of the position of the power-supplying secondary coil, the position corresponding to the positional information acquired by the information acquisition member.

According to the sixth aspect of the invention, it is possible to wirelessly supply electric power to the vehicle which is parked in the parking space with high efficiency.

According to a seventh aspect of the invention, there is provided a power-supplying device for a vehicle, the power-supplying device for supplying electric power to the vehicle provided with a power-supplying secondary coil configured to wirelessly receive the electric power from a power-supplying primary coil. The power-supplying device includes: a vehicle support structure configured to support the vehicle; the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high.

According to the seventh aspect of the invention, it is possible to wirelessly supply electric power to the vehicle which is supported by the vehicle support structure with high efficiency.

According to a power-supplying device in an eighth aspect of the invention, in the seventh aspect, the vehicle stopping member may include: a wheel stopper provided in the vehicle support structure and configured to stop movement of the vehicle by coming into contact with an outer circumference of a wheel of the vehicle; and a wheel stopper moving mechanism configured to move the position of the wheel stopper in a front-and-back direction.

According to the eighth aspect of the invention, it is possible to wirelessly supply electric power to the vehicle which is supported by the vehicle support structure with high efficiency.

According to a power-supplying device in a ninth aspect of the invention, in the seventh aspect, the vehicle stopping member may include; a wheel stopper provided in the vehicle support structure and configured to stop the movement of the vehicle by coming into contact with an outer circumference of a wheel of the vehicle; a wheel stopper moving mechanism configured to move a position of the wheel stopper in a front-and-back direction; and an acquisition member configured to acquire positional information corresponding to a position of a power-supplying secondary coil provided in the vehicle. The wheel stopper moving mechanism may move the position of the wheel stopper in the front-and-back direction on the basis of the positional information acquired by the acquisition member.

According to the ninth aspect of the invention, it is possible to wirelessly supply electric power to the vehicle which is supported by the vehicle support structure with high efficiency.

According to a power-supplying device in a tenth aspect of the invention, in the seventh aspect, the vehicle stopping member may include: a wheel stopper provided in the vehicle support structure and configured to stop movement of the vehicle by coming into contact with an outer circumference of a wheel of the vehicle; a wheel stopper moving mechanism configured to move a position of the wheel stopper in a front-and-back direction; a storage member configured to store vehicle type information of the vehicle and positional information, corresponding to a position of the power-supplying secondary coil provided in the vehicle so as to be associated with each other; and an information acquisition member configured to receive the vehicle type information of the vehicle and acquire the positional information associated, with the vehicle type information from the storage member. The wheel stopper moving mechanism may move the position of the wheel stopper in the front-and-back direction on the basis of the position of the power-supplying secondary coil, the position corresponding to the positional information acquired by the information acquisition member.

According to the tenth aspect of the invention, it is possible to wirelessly supply electric power to the vehicle which is supported by the vehicle support structure with high efficiency.

According to a power-supplying device in an eleventh aspect of the invention, in the seventh aspect, the vehicle stopping member may include: an acquisition member configured to acquire a position of the power-supplying secondary coil provided in the vehicle; and an instruction member configured to instruct a driver of the vehicle moving onto the vehicle support structure on stop timing on the basis of the position of the power-supplying secondary coil acquired by the acquisition member.

According to the eleventh aspect of the invention, it is possible to wirelessly supply electric power to the vehicle which is supported by the vehicle support, structure with high efficiency.

According to a power-supplying device in a twelfth aspect of the invention, in the seventh aspect, the vehicle stopping member may include: a storage member configured to store vehicle type information of the vehicle and positional information corresponding to a position of the power-supplying secondary coil provided in the vehicle so as to be associated with each other; an information acquisition member configured to receive the vehicle type information of the vehicle and acquire the positional information associated with the vehicle type information from the storage member; and an instruction member configured to instruct a driver of the vehicle moving onto the vehicle support structure on stop timing on the basis of the position of the power-supplying secondary coil, the position corresponding to the positional information acquired by the information acquisition member.

According to the twelfth aspect of the invention, it is possible to wirelessly supply electric power to the vehicle which is supported by the vehicle support structure with high efficiency.

Effects of the Invention

The power-supplying device according to the invention has the following effects.

When a vehicle enters a parking space provided with the power-supplying primary coil which can wirelessly supply electric power to the power-supplying secondary coil provided in the vehicle, the vehicle is stopped at the position where wireless power supply efficiency is high. Therefore, it is possible to wirelessly supply electric power to the vehicle parking in the parking space with high efficiency.

The position of the wheel stopper provided in the parking space can be moved in the front-and-back direction on the basis of the position of the power-supplying secondary coil provided in the vehicle. Therefore, it is possible to wirelessly supply electric power to the vehicle which is parked in the parking space with high efficiency.

The position of the power-supplying secondary coil provided in the vehicle is acquired and the position of the wheel stopper provided in the parking space can be moved in the front-and-back direction on the basis of the acquired position of the power-supplying secondary coil. Therefore, it is possible to wirelessly supply electric power to the vehicle which is parked in the parking space with high efficiency.

The position of the wheel stopper provided in the parking space can be moved in the front-and-back direction on the basis of the position of the power-supplying secondary coil which is obtained on the basis of the vehicle type information of the vehicle. Therefore, it is possible to wirelessly supply electric power to the vehicle which is parked in the parking space with high efficiency.

The position of the power-supplying secondary coil provided in the vehicle is acquired and the driver of the vehicle which enters the parking space is instructed on stop timing on the basis of the acquired position of the power-supplying secondary coil. Therefore, it is possible to wirelessly supply electric power to the vehicle which is parked in the parking space with high efficiency.

The driver of the vehicle which enters the parking space is instructed on stop timing on the basis of the position of the power-supplying secondary coil obtained on the basis of the vehicle type information, of the vehicle. Therefore, it is possible to wirelessly supply electric power to the vehicle which is parked in the parking space with high efficiency.

When the vehicle moves onto the vehicle support structure provided with the power-supplying primary coil which can wirelessly supply electric power to the power-supplying secondary coil, provided in the vehicle, the vehicle is stopped at the position where wireless power supply efficiency is high. Therefore, it is possible to wirelessly supply electric power to the vehicle supported by the vehicle support, structure with high efficiency.

The position of the wheel stopper provided in the vehicle support structure can be moved in the front-and-back direction on the basis of the position of the power-supplying secondary coil provided in the vehicle. Therefore, it is possible to wirelessly supply electric power to the vehicle supported by the vehicle support structure with high efficiency.

The position of the power-supplying secondary coil provided to the vehicle is acquired and the position of the wheel stopper provided in the vehicle support structure can be moved in the front-and-back direction on the basis of the acquired position of the power-supplying secondary coil. Therefore, it is possible to wirelessly supply electric power to the vehicle supported by the vehicle support structure with high efficiency.

The position of the wheel stopper provided in the vehicle support structure can be moved in the front-and-back direction on the basis of the position of the power-supplying secondary coil which is obtained on the basis of the vehicle type information of the vehicle. Therefore, it is possible to wirelessly supply electric power to the vehicle supported by the vehicle support structure with high efficiency.

The position, of the power-supplying secondary coil provided in the vehicle is acquired and the driver of the vehicle which moves onto the vehicle support structure is instructed, on stop timing on the basis of the acquired position, of the power-supplying secondary coil. Therefore, it is possible to wirelessly supply electric power to the vehicle supported by the vehicle support structure with high efficiency.

The driver of the vehicle which moves onto the vehicle support structure is instructed on stop timing on the basis of the position of the power-supplying secondary coil which is obtained on the basis of the vehicle type information of the vehicle. Therefore, it is possible to wirelessly supply electric power to the vehicle supported by the vehicle support structure with high efficiency.

Therefore, it is possible to provide a power-supplying device for a vehicle that has a simple structure and low energy loss and is easy to use.

EMBODIMENTS FOR CARRYING OUT THE INVENTION

Hereinafter, embodiments of the invention wilt be described with reference to the drawings.

First, a power-supplying device for a vehicle according to a first embodiment of the invention will be described with reference to the drawings.

Figure 1:
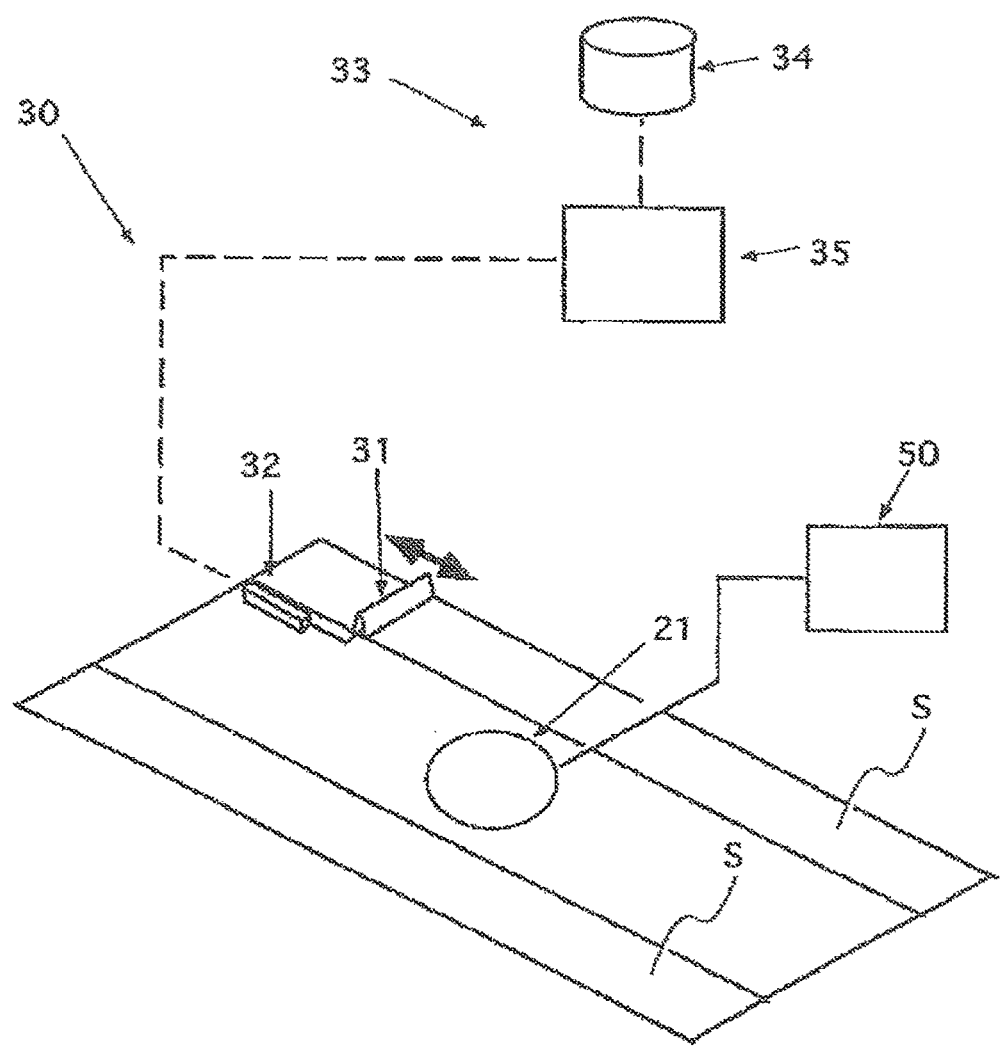
FIG. 1 is a perspective view illustrating a power-supplying device for a vehicle according to a first embodiment of the invention.
Figure 2A:
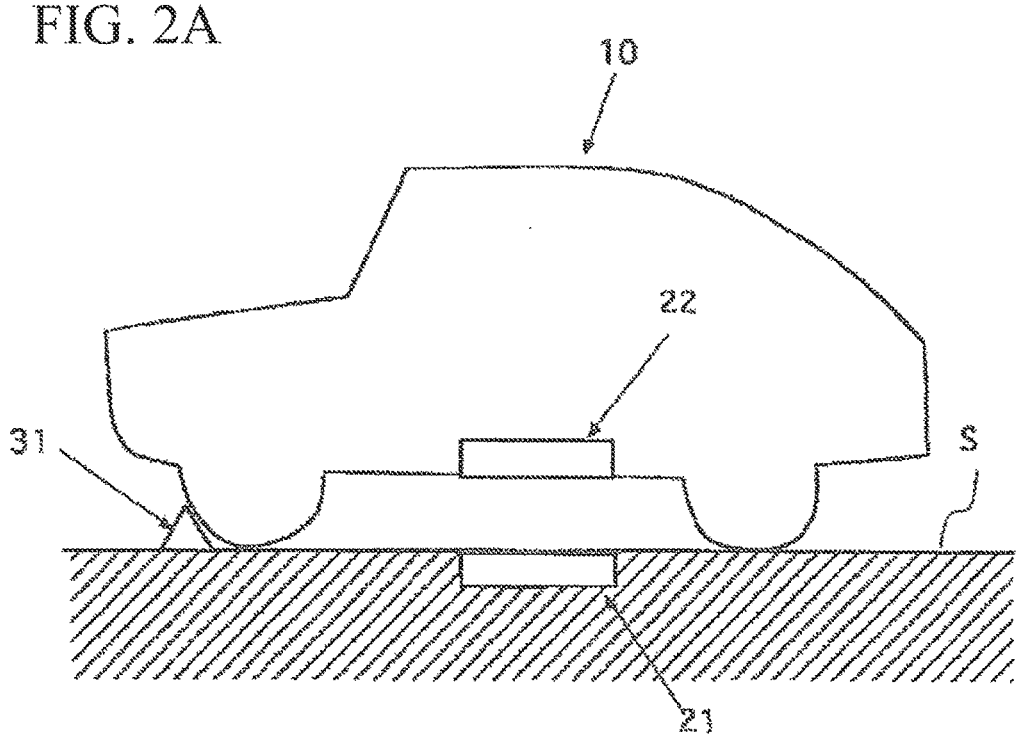
FIG. 2A is a side view illustrating the power-supplying device for a vehicle according to the first embodiment of the invention.
Figure 2B:
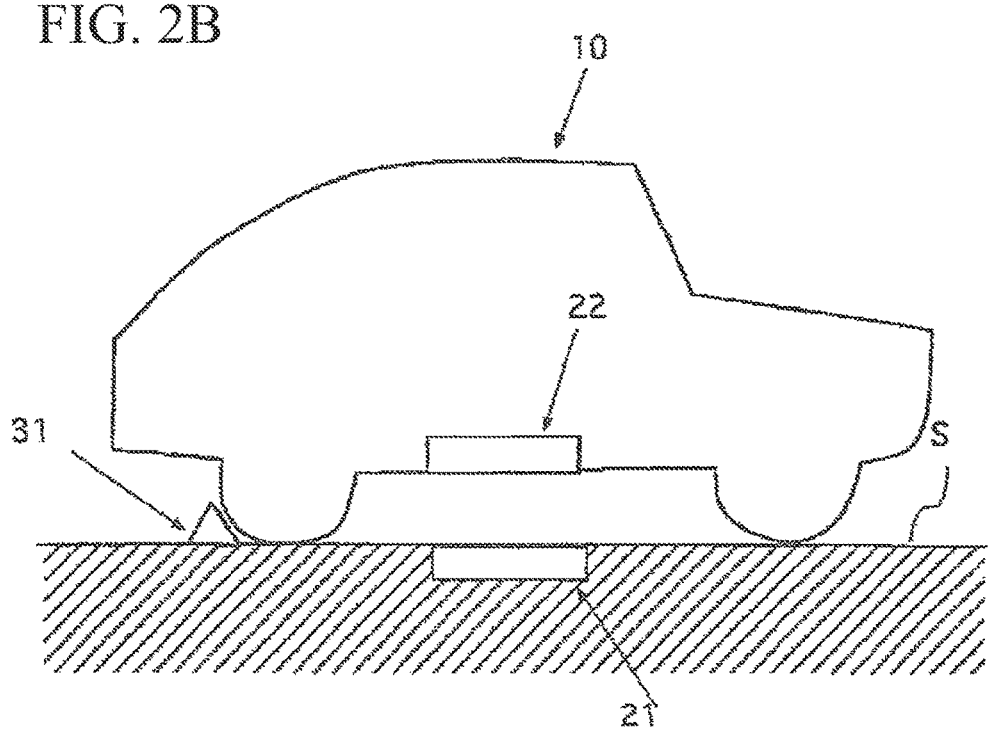
FIG. 2B is a side view illustrating the power-supplying device for a vehicle according to the first embodiment of the invention.

FIG. 1 is a perspective view illustrating the power-supplying device for a vehicle according to the first embodiment of the invention. FIGS. 2A and 2B are side views illustrating the power-supplying device for a vehicle according to the first embodiment of the invention.

The power-supplying device for a vehicle according to the first embodiment of the invention can supply electric power to a vehicle 10. The power-supplying device for a vehicle according to the first embodiment of the invention includes a power-supplying primary coil 21 and a vehicle stopping member 30. The power-supplying device for a vehicle according to the first embodiment of the invention may include the power-supplying primary coil 21, the vehicle stopping member 30, and a driving circuit 50.

The vehicle 10 is a movable body which can receive electric power. For example, the vehicle 10 is a car which can receive electric power. The vehicle 10 may include a power-supplying secondary coil 22 which can wirelessly receive electric power from the power-supplying primary coil 21.

For example, the power-supplying secondary coil 22 which can wirelessly receive electric power from the power-supplying primary coil 21 may be provided on the lower surface of the vehicle 10.

The power-supplying secondary coil 22 wirelessly receives electric power from the power-supplying primary coil 21 which is provided below the power-supplying secondary coil 22. At that time, for example, magnetic resonance wireless power supply, electric resonance wireless power supply, or electromagnetic induction, wireless power supply is performed.

The power-supplying primary coil 21 can wirelessly supply electric power to the power-supplying secondary coil 22. The power-supplying primary coil 21 is provided in a parking space in which the vehicle 10 is parked and can wirelessly supply electric power to the power-supplying secondary coil 22.

When an electric current flows to the power-supplying primary coil 21, the magnetic field is generated in the space and an electric current is induced by the magnetic field in the power-supplying secondary coil 22 which is placed in the magnetic field.

For example, when an alternating electric current flows to the power-supplying primary coil 21, the magnetic field is generated in the space and an electric current is induced by the magnetic field in the power-supplying secondary coil 22 which is placed in the magnetic field.

The parking space is, for example, a horizontal concrete floor.

The vehicle stopping member 30 stops the vehicle 10 at a desired position of the parking space such that the vehicle 10 can be stopped at the position where wireless power supply efficiency from the power-supplying primary coil 21 to the power-supplying secondary coil 22 is high. Hereinafter, the vehicle stopping member 30 will be described in detail.

The vehicle stopping member (Example 1) 30 includes a wheel stopper 31 and a wheel stopper moving mechanism 32. The wheel stopper 31 is provided in the parking space, comes into contact with the outer circumference of the wheel of the vehicle 10, and stops the movement of the vehicle 10.

The wheel stopper 31 is provided on the runway S in an orientation in which the rotation of the wheel is prevented, comes into contact with the outer circumference of the wheel of the vehicle 10, and stops the movement of the vehicle 10.

The wheel stopper moving mechanism 32 can move the position of the wheel stopper 31 in the front-and-back direction.

For example, the wheel stopper moving mechanism 32 is an actuator which moves the wheel stopper 31 in the front-and-back direction. For example, a mechanism which converts the rotation of an electric motor into a rectilinear motion using a ball screw can be used as the actuator.

For example, the wheel stopper moving mechanism 32 moves the wheel stopper 31 in the front-and-back direction on the basis of the position of the power-supplying secondary coil 22 provided in the vehicle 10.

As a result, it is possible to stop the vehicle 10 at the position where wireless power supply efficiency from the power-supplying primary coil 21 to the power-supplying secondary coil 22 is high.

The vehicle stopping member (Example 2) 30 includes a wheel stopper 31, the wheel stopper moving mechanism 32, and an acquisition member 33.

The wheel stopper 31 is provided in the parking space, comes into contact with the outer circumference of the wheel of the vehicle 10, and stops the movement of the vehicle 10.

The wheel stopper 31 is provided on the runway S in an orientation in which the rotation, of the wheel is prevented, comes into contact with the outer circumference of the wheel of the vehicle 10, and stops the movement of the vehicle 10.

The wheel stopper moving mechanism 32 can move the position of the wheel stopper 31 in the front-and-back direction.

For example, the wheel stopper moving mechanism 32 is an actuator which moves the wheel stopper 31 in the front-and-back direction.

For example, the wheel stopper moving mechanism 32 moves the wheel stopper 31 in the front-and-back direction on the basis of the position of the power-supplying secondary coil 22 provided in the vehicle 10.

The acquisition member 33 acquires positional information corresponding to the position of the power-supplying secondary coil 22 provided in the vehicle 10.

For example, the acquisition member 33 is a detector which detects the position of the power-supplying secondary coil 22 provided in the vehicle 10. For example, the detector captures the digital image of the entire vehicle 10, performs image processing to calculate the relative position of the wheel and the power-supplying secondary coil 22 in the image, and multiplies a coefficient for converting the distance in the image into the actual distance to convert the distance into the actual distance (positional information) between the wheel and the power-supplying secondary coil 22. In addition, when the type of the vehicle 10 is known in advance, the distance (positional information) between the wheel and the power-supplying secondary coil 22 may be measured in advance, may be stored in the acquisition member 33, and may be retrieved.

The wheel stopper moving mechanism 32 moves the position of the wheel stopper 31 in the front-and-back direction on the basis of the positional information acquired by the acquisition member 33 and the positional information of the power-supplying primary coil 21 provided in the parking space.

For example, when the wheel of the vehicle 10 comes into contact with the wheel stopper 31 and is stopped, the wheel stopper moving mechanism 32 moves the position of the wheel stopper 31 in the front-and-back direction such that wireless power supply efficiency from the power-supplying primary coil 21 to the power-supplying secondary coil 22 is high.

For example, when the wheel of the vehicle 10 comes into contact with the wheel stopper 31 and is stopped, the wheel stopper moving mechanism 32 moves the position of the wheel stopper 31 in the front-and-back direction such that the power-supplying primary coil 21 faces the power-supplying secondary coil 22.

The vehicle stopping member (Example 3) 30 includes the wheel stopper 31, the wheel stopper moving mechanism 32, a storage member 34, and an information acquisition member 35.

The wheel stopper 31 is provided in the parking space, comes into contact with the outer circumference of the wheel of the vehicle 10, and stops the movement of the vehicle 10.

The wheel stopper 31 is provided on the runway S in an orientation in which the rotation of the wheel is prevented, comes into contact with the outer circumference of the wheel of the vehicle 10, and stops the movement of the vehicle 10.

The wheel stopper moving mechanism 32 can move the position of the wheel stopper 31 in the front-and-back direction.

For example, the wheel stopper moving mechanism 32 is an actuator which moves the wheel stopper 31 in the front-and-back direction on the basis of the position of the power-supplying secondary coil 22 provided in the vehicle 10.

The storage member 34 stores the vehicle type information of the vehicle 10 and positional, information corresponding to the position of the power-supplying secondary coil 22 provided in the vehicle 10 so as to be associated with each other.

The information acquisition member 35 receives the vehicle type information of the vehicle 10 and acquires the positional information associated with the vehicle type information from the storage member 34.

The wheel stopper moving mechanism 32 moves the position of the wheel stopper 31 in the front-and-back direction on the basis of the positional information acquired by the information acquisition member 35.

For example, when the wheel of the vehicle 10 comes into contact with the wheel stopper 31 and is stopped, the wheel stopper moving mechanism 32 moves the position of the wheel stopper 31 in the front-and-back direction such that wireless power supply efficiency from the power-supplying primary coil 21 to the power-supplying secondary coil 22 is high.

For example, when the wheel of the vehicle 10 comes into contact with the wheel stopper 31 and is stopped, the wheel stopper moving mechanism 32 moves the position of the wheel stopper 31 in the front-and-back direction such that the power-supplying primary coil 21 faces the power-supplying secondary coil 22.

The driving circuit 50 drives the power-supplying primary coil 21. For example, the driving circuit 50 supplies electric power to the power-supplying primary coil 21 and drives the power-supplying primary coil 21. When the driving circuit 50 supplies electric power to the power-supplying primary coil 21 and drives the power-supplying primary coil 21, the power-supplying primary coil 21 generates the magnetic field. When the driving circuit 50 appropriately drives the power-supplying primary coil 21, it is possible to wirelessly supply electric power with high efficiency.

Next, a power-supplying device for a vehicle according to a second embodiment of the invention will be described with reference to the drawings.

Figure 3:
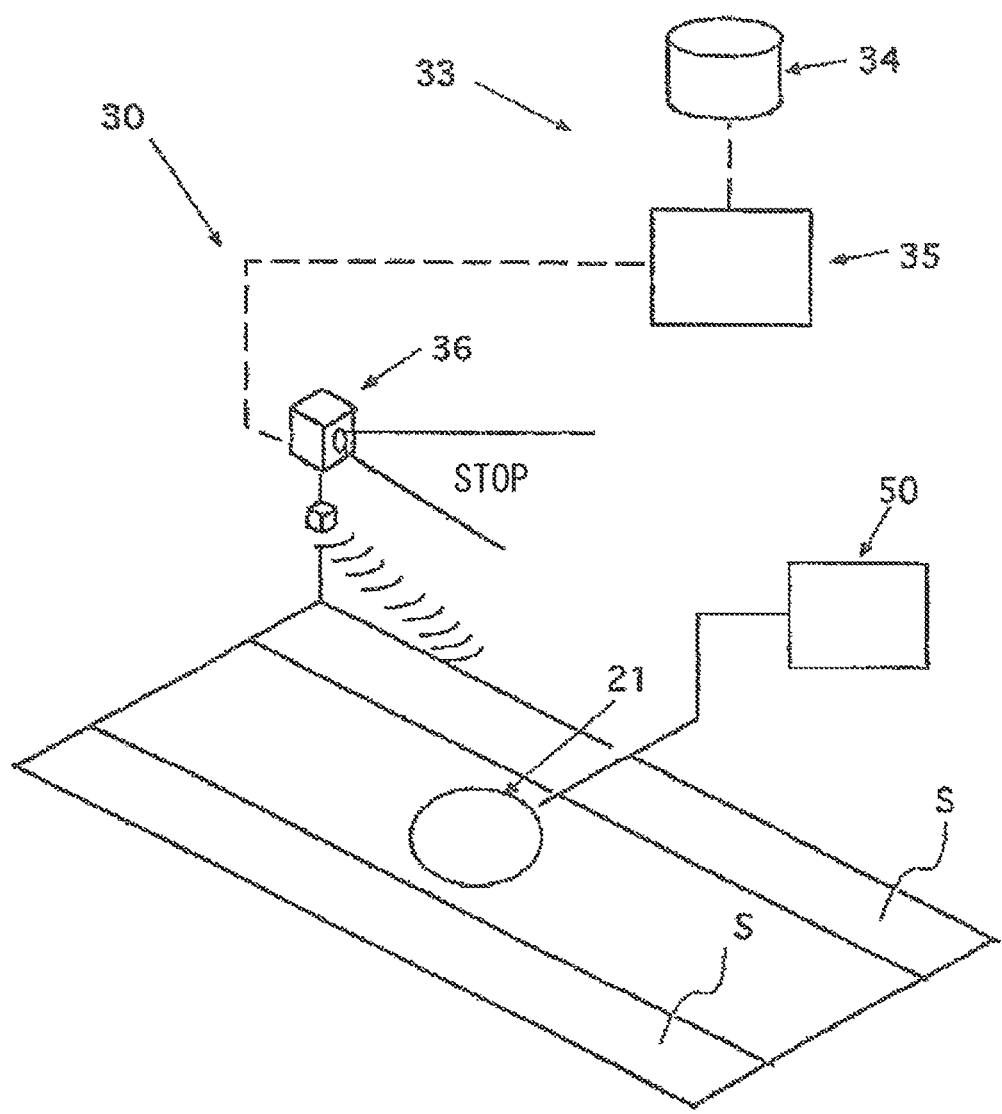
FIG. 3 is a perspective view illustrating a power-supplying device for a vehicle according to a second embodiment of the invention.

FIG. 3 is a perspective view illustrating the power-supplying device for a vehicle according to the second embodiment of the invention.

The power-supplying device for a vehicle according to the second embodiment of the invention can supply electric power to a vehicle 10.

The power-supplying device for a vehicle according to the second embodiment of the invention includes a power-supplying primary coil 21 and the vehicle stopping member 30.

The power-supplying device for a vehicle according to the second embodiment of the invention may include the power-supplying primary coil 21, the vehicle stopping member 30, and the driving circuit 50.

Since the vehicle 10, the power-supplying primary coil 21, and the driving circuit 50 have the same structure as those in the power-supplying device for a vehicle according to the first embodiment, the description thereof will not be repeated.

The vehicle stopping member 30 stops the vehicle 10 at a desired, position of a parking space such that the vehicle 10 can be stopped at the position where wireless power supply efficiency from the power-supplying-primary coil 21 to a power-supplying secondary coil 22 is high. Hereinafter, the vehicle stopping member 30 will be described in detail.

The vehicle stopping member (Example 4) 30 includes the acquisition member 33 and an instruction member 36.

The acquisition member 33 acquires positional information corresponding to the position of the power-supplying secondary coil 22 provided in the vehicle 10.

For example, the acquisition member 33 is a detector which detects the position of the power-supplying secondary coil 22 provided in the vehicle 10.

The instruction member 36 instructs the driver of the vehicle 10 which enters the parking space on stop timing on the basis of the position of the power-supplying secondary coil 22 acquired by the acquisition member 33.

For example, the instruction member 36 includes a sensor which detects the position of the vehicle 10 and an audio device.

For example, in the instruction member 36, when the position of the vehicle 10 detected by the sensor is aligned with a desired position, the audio device outputs a "stop" sound.

For example, when the driver hears the "stop" sound from the audio device and the wheel is stopped, wireless power supply efficiency from the power-supplying primary coil 21 to the power-supplying secondary coil 22 is high.

For example, when the driver hears the "stop" sound from the audio device and the wheel is stopped, the power-supplying primary coil 21 faces the power-supplying secondary coil 22.

The vehicle stopping member (Example 5) 30 includes the storage member 34, the information acquisition member 35, and the instruction member 36.

The storage member 34 stores the vehicle type information of the vehicle 10 and positional information corresponding to the position of the power-supplying secondary coil 22 provided in the vehicle 10 so as to be associated with each other.

The information acquisition member 35 receives the vehicle type information of the vehicle 10 and acquires the positional information associated with the vehicle type information from the storage member 34.

The instruction member 36 instructs the driver of the vehicle 10 which enters the parking space on stop timing on the basis of the position of the power-supplying secondary coil 22 corresponding to the positional information acquired by the information acquisition member 35.

For example, the instruction member 36 includes a sensor which detects the position of the vehicle 10 and an audio device.

For example, in the instruction member 36, when the position of the vehicle 10 detected by the sensor is aligned with a desired position derived from the acquired positional information, the audio device outputs the "stop" sound.

For example, when the driver heats the "stop" sound from the audio device and the wheel is stopped, wireless power supply efficiency from the power-supplying primary coil 21 to the power-supplying secondary coil 22 is high.

For example, when the driver hears the "stop" sound from the audio device and the wheel is stopped, the power-supplying primary coil 21 faces the power-supplying secondary coil 22.

Figure 4:
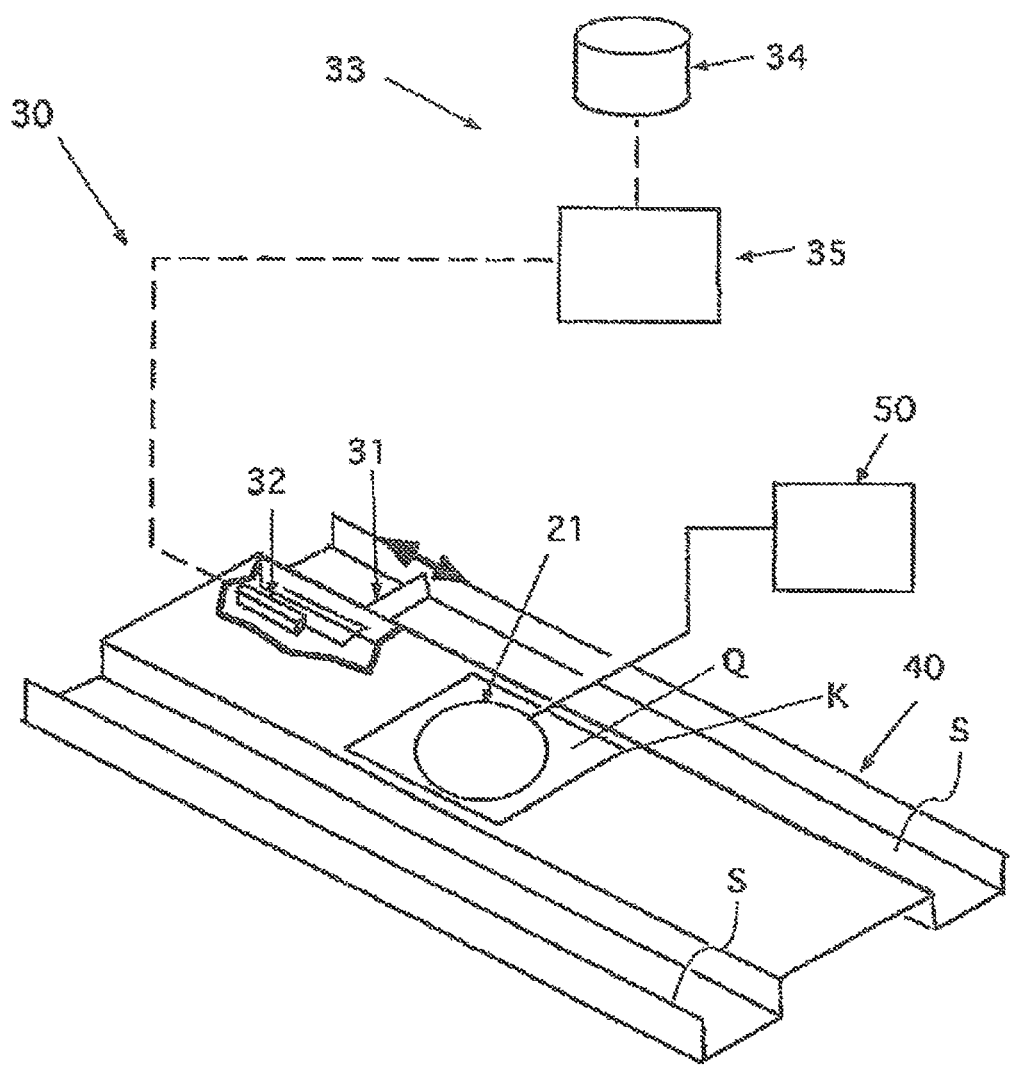
FIG. 4 is a perspective view illustrating a power-supplying device for a vehicle according to a third embodiment of the invention.

Next, a power-supplying device for a vehicle according to a third embodiment of the invention will be described with reference to the drawings. FIG. 4 is a perspective view illustrating the power-supplying device for a vehicle according to the third embodiment of the invention.

The power-supplying device for a vehicle according to the third embodiment of the invention can supply electric power to a vehicle 10.

The power-supplying device for a vehicle according to the third embodiment of the invention includes the power-supplying primary coil 21, the vehicle stopping member 30, and a vehicle support structure 40.

The power-supplying device for a vehicle according to the third embodiment of the invention may include the power-supplying primary coil 21, the vehicle stopping member 30, the vehicle support structure 40, and the driving circuit 50.

The vehicle support structure 40 is, for example, a pallet in a mechanical-parking station. In general, a plurality of vehicle support structures 40 are provided and can be moved with the vehicle mounted thereon.

For example, the power-supplying primary coil 21 may be provided in the vehicle support structure 40 of in a parking space. The parking space is, for example, the internal space of a building in a mechanical-parking station (a fixed side when the vehicle support structure 40 is moved). When the power-supplying primary coil 21 is provided in the parking space, a hole through which magnetic flux passes is formed above the power-supplying primary coil 21 of the vehicle support structure 40 in the parking space. Therefore, the vehicle support structure 40 does not interfere with the magnetic field generated by the power-supplying primary coil 21.

Since the vehicle 10 has the same structure as that in the power-supplying device for a vehicle according to the first embodiment, the description thereof will not be repeated.

Since the main portion of the structure of the power-supplying primary coil 21 is the same as that in the power-supplying device for a vehicle according to the first embodiment, only different points will be described here.

The power-supplying primary coil 21 can wirelessly supply electric power to a power-supplying secondary coil 22 which is provided in the vehicle 10 supported by the vehicle support structure 40.

The power-supplying primary coil 21 is provided in the vehicle support structure 40.

The power-supplying primary coil 21 may be provided in a space of the vehicle support structure 40 corresponding to the stop position of the vehicle 10. When the power-supplying primary coil 21 is provided in the space corresponding to the stop position, an opening Q is vertically formed at a position corresponding to the power-supplying primary coil 21 of the vehicle support structure 40.

The vehicle stopping member 30 stops the vehicle 10 at a desired position of the vehicle support structure 40 such that the vehicle 10 can be stopped at the position where wireless power supply efficiency from the power-supplying primary coil 21 to the power-supplying secondary coil 22 is high. Hereinafter, the vehicle stopping member 30 will be described in detail.

The vehicle stopping member (Example 6) 30 includes the wheel stopper 31 and the wheel stopper moving mechanism 32.

The wheel stopper 31 is provided in the vehicle support structure 40, comes into contact with the outer circumference of the wheel of the vehicle 10, and stops the movement of the vehicle 10. The wheel stopper 31 is provided on a runway S in an orientation in which the rotation of the wheel is prevented, comes into contact with the outer circumference of the wheel of the vehicle 10, and stops the movement of the vehicle 10.

The wheel stopper moving mechanism 32 can move the position of the wheel stopper 31 in the front-and-back direction.

For example, the wheel stopper moving mechanism 32 is as actuator which moves the wheel stopper 31 in the front-and-back direction on the basis of the position of the power-supplying secondary coil 22 provided in the vehicle 10.

The vehicle stopping member (Example 7) 30 includes the wheel stopper 31, the wheel stopper moving mechanism 32, and the acquisition member 33.

The wheel stopper 31 is provided in the vehicle support structure 40, comes into contact with the outer circumference of the wheel of the vehicle 10, and stops the movement of the vehicle 10.

The wheel stopper 31 is provided on the runway S in an orientation in which the rotation of the wheel is prevented, comes into contact with the outer circumference of the wheel of the vehicle 10, and stops the movement of the vehicle 10.

The wheel stopper moving mechanism 32 can move the position of the wheel stopper 31 in the front-and-back direction.

For example, the wheel stopper moving mechanism 32 is aft actuator which moves the wheel stopper 31 in the front-and-back direction, of the basis of the position of the power-supplying secondary coil 22 provided in the vehicle 10.

The acquisition member 33 acquires positional information corresponding to the position of the power-supplying secondary coil 22 provided in the vehicle 10.

For example, the acquisition member 33 is a detector which detects the positional information of the power-supplying secondary coil 22 provided in the vehicle 10.

The wheel stopper moving mechanism 32 moves the position of the wheel stopper 31 in the front-and-back direction on the basis of the positional insinuation acquired by the acquisition member 33 and the positional information of the power-supplying primary coil 21 provided in the parking space.

For example, when the wheel of the vehicle 10 comes into contact with the wheel stopper 31 and is stopped, the wheel stopper moving mechanism 32 moves the position of the wheel stopper 31 in the front-and-back direction such that wireless power supply efficiency from the power-supplying primary coil 21 to the power-supplying secondary coil 22 is high.

For example, when the wheel of the vehicle 10 comes into contact with the wheel stopper 31 and is stopped, the wheel stopper moving mechanism 32 moves the position of the wheel stopper 31 in the front-and-back direction such that the power-supplying primary coil 21 faces the power-supplying secondary coil 22.

The vehicle stopping member (Example 8) 30 includes the wheel stopper 31, the wheel stopper moving mechanism 32, the storage member 34, and the information acquisition member 35.

The wheel stopper 31 is provided in the vehicle support structure 40, comes into contact with the outer circumference of the wheel of the vehicle 10, and stops the movement of the vehicle 10. The wheel stopper 31 is provided on the runway S in an orientation in which the rotation of the wheel is prevented, comes into contact with the outer circumference of the wheel of the vehicle 10, and stops the movement of the vehicle.

The wheel stopper moving mechanism 32 can move the position of the wheel stopper 31 in the front-and-back direction.

For example, the wheel stopper moving mechanism 32 is an actuator which moves the wheel stopper 31 in the front-and-back direction on the basis of the position of the power-supplying secondary coil 22 provided in the vehicle 10.

The storage member 34 stores the vehicle type information of the vehicle 10 and positional information corresponding to the position of the power-supplying secondary coil 22 provided in the vehicle 10 so as to be associated with each other.

The information acquisition member 35 receives the vehicle type information of the vehicle 10 and acquires the positional information associated with the vehicle type information from the storage member 34.

The wheel stopper moving mechanism 32 moves the position of the wheel stopper 31 in the front-and-back direction on the basis of the positional information acquired by the information acquisition member 35.

For example, when the wheel of the vehicle 10 comes into contact with the wheel stopper 31 and is stopped, the wheel stopper moving mechanism 32 moves the position of the wheel stopper 31 in the front-and-back direction such that wireless power supply efficiency from the power-supplying primary coil 21 to the power-supplying secondary coil 22 is high.

For example, when the wheel of the vehicle 10 comes into contact with the wheel stopper 31 and is stopped, the wheel stopper moving mechanism 32 moves the position of the wheel stopper 31 in the front-and-back direction such that the power-supplying primary coil 21 faces the power-supplying secondary coil 22.

The vehicle support structure 40 is a structure which, supports the vehicle 10. For example, the vehicle support structure 40 may be a structure which has a substantially rectangular shape in a top view, supports the wheels of the vehicle 10 to support the vehicle 10, and has an opening Q that is vertically formed and has a predetermined outline K.

For example, the vehicle support structure 40 is a so-called pallet and the opening Q is provided at the center of the pallet in a top view. The opening Q is surrounded by the outline K.

For example, wheels which are provided in the lower part of the pallet can be rotated to move in the parking space.

The power-supplying primary coil 21 wirelessly supplies electric power to the power-supplying secondary coil 22 through the opening Q surrounded by the outline K. The power-supplying primary coil 21 may be surrounded by the outline K in a top view.

FIG. 4 illustrates an example of the vehicle support structure 40. The vehicle support structure 40 forms a pair of left and right runway S.

The wheels of the vehicle 10 are rotated on the runway S and the vehicle 10 moves onto the vehicle support structure 40.

The wheel stopper 31 is provided on the runway S so as to prevent the rotation of the wheel.

The pair of left and right runway S support each pair of front and rear wheels of the vehicle 10.

The pair of left and right runway S integrally support the vehicle 10.

Since the driving circuit 50 has the same structure as the driving circuit 50 of the power-supplying device for a vehicle according to the first embodiment, the description thereof will not be repeated.

Next, a power-supplying device for a vehicle according to a fourth embodiment of the invention will be described with reference to the drawings.

Figure 5:
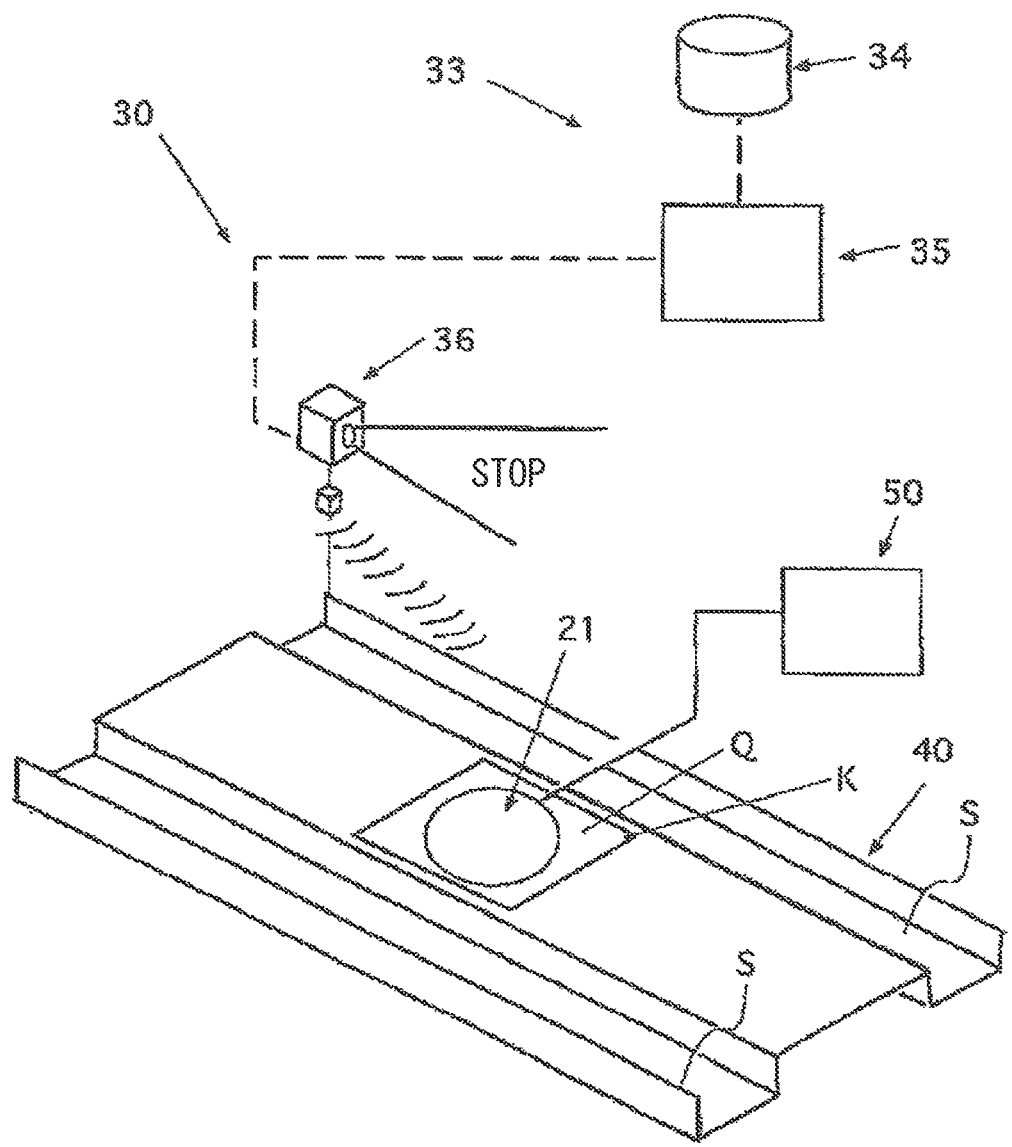
FIG. 5 is a perspective view illustrating a power-supplying device for a vehicle according to a fourth embodiment of the invention.
Figure 6:
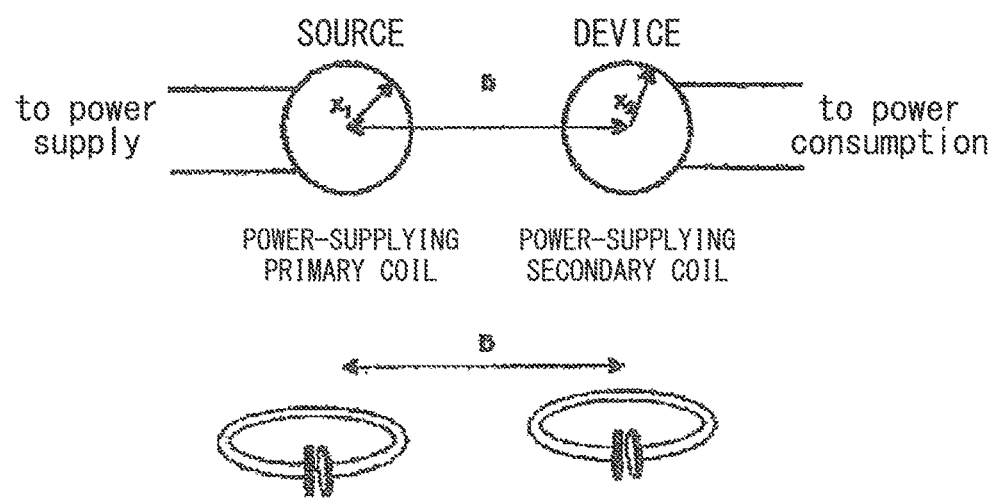
FIG. 6 is a conceptual, diagram, illustrating a wireless power-supplying system.

FIG. 5 is a perspective view illustrating the power-supplying device for a vehicle according to the fourth embodiment of the invention.

The power-supplying device for a vehicle according to the fourth embodiment of the invention can supply electric power to a vehicle 10.

The power-supplying device for a vehicle according to the fourth embodiment of the invention includes the power-supplying primary coil 21, the vehicle stopping member 30, and the vehicle support structure 40.

The power-supplying device for a vehicle according to the fourth embodiment of the invention may include the power-supplying primary coil 21, the vehicle stopping member 30, the vehicle support structure 40, and the driving circuit 50.

Since the vehicle 10, the power-supplying primary coil 21, the vehicle support structure 40, and the driving circuit 50 have the same structure as the vehicle 10, the power-supplying primary coil 21, the vehicle support structure 40, and the driving circuit 50 in the power-supplying device for a vehicle according to the third embodiment, respectively, the description thereof will not be repeated.

The vehicle stopping member 30 stops the vehicle 10 at a desired, position of a parking space such that the vehicle 10 can be stopped at the position where wireless power supply efficiency from the power-supplying primary coil 21 to a power-supplying secondary coil 22 is high. Hereinafter, the vehicle stopping member 30 will be described in detail.

The vehicle stopping member (Example 9) 30 includes the acquisition member 33 and the instruction member 36.

The acquisition member 33 acquires positional information corresponding to the position of the power-supplying secondary coil 22 provided in the vehicle 10.

For example, the acquisition member 33 is a detector which detects the positional information of the power-supplying secondary coil 22 provided in the vehicle 10.

The instruction member 36 instructs the driver of the vehicle 10 which moves onto the vehicle support structure 40 on stop timing on the basis of the position of the power-supplying secondary coil 22 acquired by the acquisition member 33.

For example, the instruction member 36 includes a sensor which detects the position of the vehicle 10 and the audio device.

For example, in the instruction member 36, when the position of the vehicle 10 detected by the sensor is aligned with a desired position, the audio device outputs the "stop" sound.

For example, when the driver heats the "stop" sound from the audio device and the wheel is stopped, wireless power supply efficiency from the power-supplying primary coil 21 to the power-supplying secondary coil 22 is high.

For example, when the driver hears the "stop" sound from the audio device and the wheel is stopped, the power-supplying primary coil 21 faces the power-supplying secondary coil 22.

The vehicle stopping member (Example 10) 30 includes the storage member 34, the information acquisition member 35, and the instruction member 36.

The storage member 34 stores the vehicle type information of the vehicle 10 and positional information corresponding to the position of the power-supplying secondary coil 22 provided in the vehicle 10 so as to be associated with each other.

The information acquisition member 35 receives the vehicle type information of the vehicle 10 and acquires the positional information, associated with the vehicle type information font the storage member 34.

The instruction member 36 instructs the driver of the vehicle 10 which moves onto the vehicle support structure 40 on stop timing on the basis of the position of the power-supplying secondary coil 22 corresponding to the positional information acquired by the information acquisition member 35.

For example, the instruction member 36 includes a sensor which detects the position of the vehicle 10 and the audio device.

For example, in the instruction member 36, when the position of the vehicle 10 detected by the sensor is aligned with a desired position derived from the acquired positional information, the audio device outputs the "stop" sound.

For example, when the driver hears the "stop" sound from the audio device and the wheel is stopped, wireless power supply efficiency from the power-supplying primary coil 21 to the power-supplying secondary coil 22 is high.

For example, when the driver hears the "stop" sound from the audio device and the wheel is stopped, the power-supplying primary coil 21 faces the power-supplying secondary coil 22.

The power-supplying device for a vehicle according to the embodiment of the invention has the following effects.

When the vehicle 10 enters the parking space provided with the power-supplying primary coil 21 which can wirelessly supply electric power to the power-supplying secondary coil 22 provided in the vehicle 10, the vehicle 10 is stopped at the position where wireless power supply efficiency is high. Therefore, it is possible to wirelessly supply electric power to the vehicle 10 which is parked in the parking space with high efficiency.

The position of the wheel stopper 31 provided in the parking space can be moved in the front-and-back direction on the basis of the position of the power-supplying secondary coil 22 provided in the vehicle 10. Therefore, it is possible to wirelessly supply electric power to the vehicle 10 which is parked in the parking space with high efficiency.

The position of the power-supplying secondary coil 22 provided in the vehicle 10 is acquired and the position of the wheel stopper 31 provided in the parking space can be moved in the front-and-back direction on the basis of the acquired position of the power-supplying secondary coil 22 and the position of the power-supplying primary coil 21. Therefore, it is possible to wirelessly supply electric power to the vehicle 10 which is parked in the parking space with high efficiency.

The position of the wheel stopper 31 provided in the parking space can be moved in the front-and-back direction on the basis of the position of the power-supplying secondary coil 22 which is obtained on the basis of the vehicle type information of the vehicle 10 and the position of the power-supplying primary coil 21. Therefore, it is possible to wirelessly supply electric power to the vehicle 10 which is parked in the parking space with high efficiency.

The position of the power-supplying secondary coil 22 provided in the vehicle 10 is acquired and the driver of the vehicle 10 which enters the parking space is instructed on stop timing on the basis of the acquired position of the power-supplying secondary coil 22 and the position of the power-supplying primary coil 21. Therefore, it is possible to wirelessly supply electric power to the vehicle 10 which is parked in the parking space with high efficiency.

The driver of the vehicle 10 which enters the parking space is instructed on stop tinting on the basis of the position of the power-supplying secondary coil 22 obtained on the basis of the vehicle type information of the vehicle 10 and the position of the power-supplying primary coil 21. Therefore, it is possible to wirelessly supply electric power to the vehicle 10 which is parked in the parking space with high efficiency.

When the vehicle 10 moves onto the vehicle support structure 40 provided with the power-supplying primary coil 21 which can wirelessly supply electric power to the power-supplying secondary coil 22 provided in the vehicle 10, the vehicle 10 is stopped at the position where wireless power supply efficiency is high. Therefore, it is possible to wirelessly supply electric power to the vehicle 10 supported by the vehicle support structure 40 with high efficiency.

The position of the wheel stopper 31 provided in the vehicle support structure 40 can be moved in the front-and-back direction on the basis of the position of the power-supplying secondary coil 22 provided in the vehicle 10 and the position of the power-supplying primary coil 21. Therefore, it is possible to wirelessly supply electric power to the vehicle 10 supported by the vehicle support structure 40 with high efficiency.

The position of the power-supplying secondary coil 22 provided in the vehicle 10 is acquired and the position of the wheel stopper 31 provided in the vehicle support structure 40 can be moved in the front-and-back direction on the basis of the acquired position of the power-supplying secondary coil 22 and the position of the power-supplying primary coil 21. Therefore, it is possible to wirelessly supply electric power to the vehicle 10 supported by the vehicle support structure 40 with high efficiency.

The position of the wheel stopper 31 provided in the vehicle support structure 40 can be moved in die front-and-back direction on die basis of the position of the power-supplying secondary coil 22 which is obtained on the basis of the vehicle type information of the vehicle 10. Therefore, it is possible to wirelessly supply electric power to the vehicle 10 supported by the vehicle support structure 40 with high efficiency.

The position of the power-supplying secondary cod 22 provided in the vehicle 10 is acquired and the driver of the vehicle 10 which moves onto the vehicle support structure 40 is instructed on stop timing on the basis of the acquired position of the power-supplying secondary coil 22 and the position of the power-supplying primary coil 21. Therefore, it is possible to wirelessly supply electric power to the vehicle 10 supported by the vehicle support structure 40 with high efficiency.

The driver of the vehicle 10 which moves onto the vehicle support structure 40 is instructed on stop timing on the basis of the position, of the power-supplying secondary coil 22 which is obtained on the basis of the vehicle type information of the vehicle 10 and the position of the power-supplying primary coil 21. It is possible to wirelessly supply electric power to the vehicle 10 supported by the vehicle support structure 40 with high efficiency.

The invention is not limited to the above-described embodiments and various modifications and changes of the invention can be made without departing from the scope of the invention.

For example, a plate made of a material which does not affect the magnetic field may cover the opening Q.

The elevator-type parking station is given as an example of the moving mechanism, of the parking station. However, the moving mechanism of the parking station is not limited thereto. For example, the moving mechanism of the parking station may be a circulation mechanism of a box-shaped circulation-type parking station, a horizontal-circulation-type parking station, a merry-go-round-type parking station, an elevator/sliding-type parking station, a plane-reciprocation-type parking station, a transport-and-storage-type parking station, and a two-stage/multi-stage parking station.

The type of a drive-in parking station may be a residential parking lot, an office parking lot, a free parking lot, a pay parking lot, or a coin parking lot.

The vehicle 10 may move forward into the parking space. The vehicle 10 may move backward into the parking space.

INDUSTRIAL APPLICABILITY

According to the power-supplying device for a vehicle of the invention, it is possible to wirelessly supply electric power to a vehicle which is parked in a parking space or a vehicle which is supported by a vehicle support structure with high-efficiency. Therefore, it is possible to provide a power-supplying device for a vehicle which has low-energy loss and a simple structure and is easy to use.

DESCRIPTION OF THE REFERENCE SYMBOLS

Q: OPENING
K: OUTLINE
S: RUNWAY
10: VEHICLE
21: POWER-SUPPLYING PRIMARY COIL
22: POWER-SUPPLYING SECONDARY COIL
30: VEHICLE STOPPING MEMBER
31: WHEEL STOPPER
32: WHEEL STOPPER MOVING MECHANISM
33: ACQUISITION MEMBER
34: STORAGE MEMBER
35: INFORMATION ACQUISITION MEMBER
36: INSTRUCTION MEMBER
40: VEHICLE SUPPORT STRUCTURE
50: DRIVING CIRCUIT

The invention claimed is:

1. A power-supplying device for a vehicle, the power-supplying device for supplying electric power to the vehicle provided with a power-supplying secondary coil configured to wirelessly receive the electric power from a power-supplying primary coil, the power supplying device comprising:
the power-supplying primary coil provided in a parking space in which the vehicle is parked, the power-supplying primary coil configured to wirelessly supply the electric power to the power-supplying secondary coil; and
a vehicle stopping member configured to stop the vehicle at a desired position of the parking space at which wireless power supply efficiency from the power-supplying primary coil to the power-supplying secondary coil is high,
wherein the vehicle stopping member includes:
a wheel stopper provided in the parking space and configured to stop movement of the vehicle by coming into contact with an outer circumference of a wheel of the vehicle;
a wheel stopper moving mechanism configured to move a position of the wheel stopper in a front-and-back direction; and
an acquisition member configured to acquire positional information corresponding to a position of the power-supplying secondary coil provided in the vehicle; and
wherein the wheel stopper moving mechanism moves the position of the wheel stopper in the front-and-back direction on the basis of the positional information acquired by the acquisition member.

2. A power-supplying device for a vehicle, the power-supplying device for supplying electric power to the vehicle provided with a power-supplying secondary coil configured to wirelessly receive the electric power from a power-supplying primary coil, the power supplying device comprising:
the power-supplying primary coil provided in a parking space in which the vehicle is parked, the power-supplying primary coil configured to wirelessly supply the electric power to the power-supplying secondary coil; and
a vehicle stopping member configured to stop the vehicle at a desired position of the parking space at which wireless power supply efficiency from the power-supplying primary coil to the power-supplying secondary coil is high,
wherein the vehicle stopping member includes:
a wheel stopper provided in the parking space and configured to stop movement of the vehicle by coming into contact with an outer circumference of a wheel of the vehicle;
a wheel stopper moving mechanism configured to move a position of the wheel stopper in a front-and-back direction;
a storage member configured to store vehicle type information of the vehicle and positional information corresponding to a position of the power-supplying secondary coil provided in the vehicle so as to be associated with each other; and
an information acquisition member configured to receive the vehicle type information of the vehicle and acquire the positional information associated with the vehicle type information from the storage member; and
wherein the wheel stopper moving mechanism moves the position of the wheel stopper in the front-and-back direction on the basis of the positional information acquired by the information acquisition member.

3. A power-supplying device for a vehicle, the power-supplying device for supplying electric power to the vehicle provided with a power-supplying secondary coil configured to wirelessly receive the electric power from a power-supplying primary coil, the power supplying device comprising:
the power-supplying primary coil provided in a parking space in which the vehicle is parked, the power-supplying primary coil configured to wirelessly supply the electric power to the power-supplying secondary coil; and a vehicle stopping member configured to stop the vehicle at a desired position of the parking space at which wireless power supply efficiency from the power-supplying primary coil to the power-supplying secondary coil is high, wherein the vehicle stopping member includes:

an acquisition member configured to acquire a position of the power-supplying secondary coil provided in the vehicle; and an instruction member configured to instruct a driver of the vehicle entering the parking space on stop timing on the basis of the position of the power-supplying secondary coil acquired by the acquisition member.

4. A power-supplying device for a vehicle, the power-supplying device for supplying electric power to the vehicle provided with a power-supplying secondary coil configured to wirelessly receive the electric power from a power-supplying primary coil, the power supplying device comprising:

the power-supplying primary coil provided in a parking space in which the vehicle is parked, the power-supplying primary coil configured to wirelessly supply the electric power to the power-supplying secondary coil; and a vehicle stopping member configured to stop the vehicle at a desired position of the parking space at which wireless power supply efficiency from the power-supplying primary coil to the power-supplying secondary coil is high, wherein the vehicle stopping member includes:

a storage member configured to store vehicle type information of the vehicle and positional information corresponding to a position of the power-supplying secondary coil provided in the vehicle so as to be associated with each other;

an information acquisition member configured to receive the vehicle type information of the vehicle and acquire the positional information associated with the vehicle type information from the storage member; and an instruction member configured to instruct a driver of the vehicle entering the parking space on stop timing on the basis of the position of the power-supplying secondary coil, the position corresponding to the positional information acquired by the information acquisition member.

5. A power-supplying device for a vehicle, the power supplying device for supplying electric power to the vehicle provided with a power-supplying secondary coil configured to wirelessly receive the electric power from a power-supplying primary coil, the power-supplying device comprising:

a vehicle support structure configured to support the vehicle;

the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high, wherein the vehicle stopping member includes:

a wheel stopper provided in the vehicle support structure and configured to stop movement of the vehicle by coming into contact with an outer circumference of a wheel of the vehicle; and a wheel stopper moving mechanism configured to move a position of the wheel stopper in a front-and-back direction.

6. A power-supplying device for a vehicle, the power supplying device for supplying electric power to the vehicle provided with a power-supplying secondary coil configured to wirelessly receive the electric power from a power-supplying primary coil, the power-supplying device comprising:

a vehicle support structure configured to support the vehicle;

the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high, wherein the vehicle stopping member includes:

a wheel stopper provided in the vehicle support structure and configured to stop movement of the vehicle by coming into contact with an outer circumference of a wheel of the vehicle;

a wheel stopper moving mechanism configured to move a position of the wheel stopper in a front-and-back direction; and an acquisition member configured to acquire positional information corresponding to a position of the power-supplying secondary coil provided in the vehicle, and wherein the wheel stopper moving mechanism moves the position of the wheel stopper in the front-and-back direction on the basis of the positional information acquired by the acquisition member.

7. A power-supplying device for a vehicle, the power supplying device for supplying electric power to the vehicle provided with a power-supplying secondary coil configured to wirelessly receive the electric power from a power-supplying primary coil, the power-supplying device comprising:

a vehicle support structure configured to support the vehicle;

the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high, wherein the vehicle stopping member includes:

a wheel stopper provided in the vehicle support structure and configured to stop movement of the vehicle by coming into contact with an outer circumference of a wheel of the vehicle;

a wheel stopper moving mechanism configured to move a position of the wheel stopper in a front-and-back direction;

a storage member configured to store vehicle type information of the vehicle and positional information corresponding to a position of the power-supplying secondary coil provided in the vehicle so as to be associated with each other; and an information acquisition member configured to receive the vehicle type information of the vehicle and acquire the positional information associated with the vehicle type information from the storage member; and wherein the wheel stopper moving mechanism moves the position of the wheel stopper in the front-and-back direction on the basis of the position of the power-supplying secondary coil, the position corresponding to the positional information acquired by the information acquisition member.

8. A power-supplying device for a vehicle, the power supplying device for supplying electric power to the vehicle provided with a power-supplying secondary coil configured to wirelessly receive the electric power from a power-supplying primary coil, the power-supplying device comprising:

a vehicle support structure configured to support the vehicle;

the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high, wherein the vehicle stopping member includes:

an acquisition member configured to acquire a position of the power-supplying secondary coil provided in the vehicle; and an instruction member configured to instruct a driver of the vehicle moving onto the vehicle support structure on stop timing on the basis of the position of the power-supplying secondary coil acquired by the acquisition member.

9. A power-supplying device for a vehicle, the power supplying device for supplying electric power to the vehicle provided with a power-supplying secondary coil configured to wirelessly receive the electric power from a power-supplying primary coil, the power-supplying device comprising:

a vehicle support structure configured to support the vehicle;

the power-supplying primary coil configured to wirelessly supply the electric power to the power-supplying secondary coil provided in the vehicle supported by the vehicle support structure; and a vehicle stopping member configured to stop the vehicle at a desired position of the vehicle support structure at which wireless power supply efficiency from the power-supplying primary coil to the power-supplying secondary coil is high, wherein the vehicle stopping member includes:

a storage member configured to store vehicle type information of the vehicle and positional information corresponding to a position of the power-supplying secondary coil provided in the vehicle so as to be associated with each other;

an information acquisition member configured to receive the vehicle type information of the vehicle and acquire the positional information associated with the vehicle type information from the storage member; and an instruction member configured to instruct a driver of the vehicle moving onto the vehicle support structure on stop timing on the basis of the position of the power-supplying secondary coil, the position corresponding to the positional information acquired by the information acquisition member.

* * * * *